(No Model.)

H. T. EACHUS.
BRAKE FOR DENTAL ENGINES.

No. 497,370.   Patented May 16, 1893.

Witnesses:-
C. L. Caldwell.
H. S. Johnson.

Inventor:-
Howard T. Eachus,
per Paul Merwin
Attorneys.

UNITED STATES PATENT OFFICE.

HOWARD T. EACHUS, OF ST. PAUL, MINNESOTA.

BRAKE FOR DENTAL ENGINES.

SPECIFICATION forming part of Letters Patent No. 497,370, dated May 16, 1893.

Application filed August 26, 1892. Serial No. 444,217. (No model.)

*To all whom it may concern:*

Be it known that I, HOWARD T. EACHUS, of St. Paul, Ramsey county, Minnesota, have invented certain Improvements in Brakes for Dental Engines, of which the following is a specification.

My invention relates to brake attachments for dental engines its object being to provide a device which is under the control of the patient, whereby he can at will, change the speed of or entirely stop the rotation of the instrument, independent of the operator.

To this end my invention consists in securing upon the standard, to which is secured the pulley for driving the flexible shaft, the frame of which is hinged, a disk brake adapted to be turned to bear against the side of the pulley, and a spring controlled fulcrum lever connected therewith adapted to be operated by the patient, whereby the brake can be thrown against the pulley with any desired pressure to reduce its speed or to entirely stop the same.

My invention further consists in the specific construction and combination hereinafter described and particularly pointed out in the claims.

Figure 1:
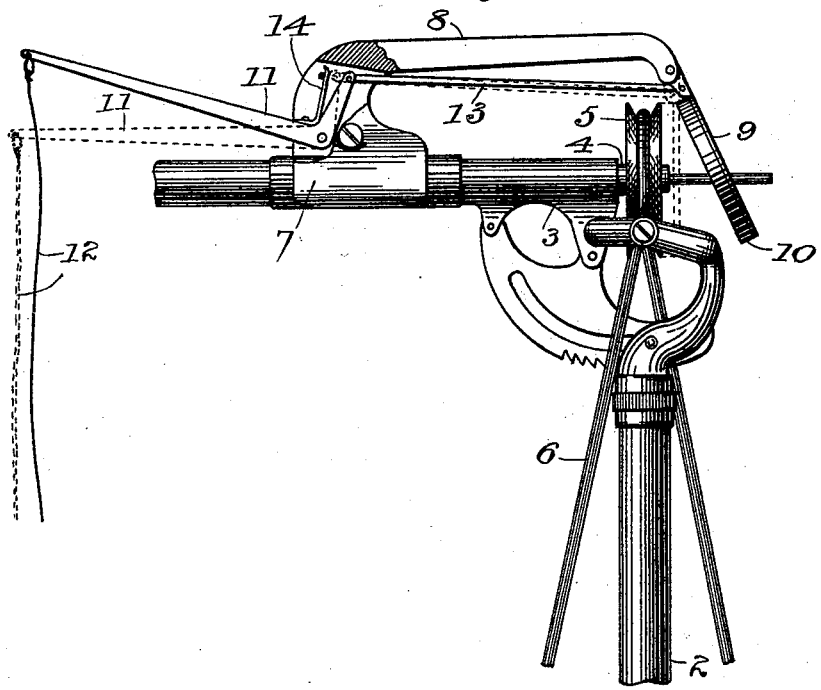
Figure 2:
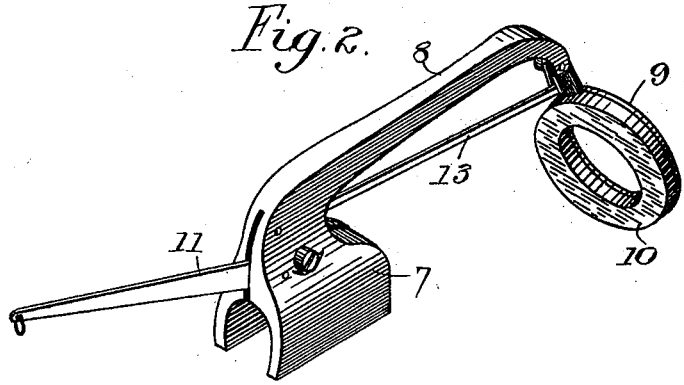

In the accompanying drawings forming part of this specification, Figure 1 is a side elevation of the top of a standard of a dental engine, shown equipped with my attachment, the full lines indicating the normal position of the brake attachment and the dotted lines the position of the brake applied, and Fig. 2 is an isometrical projection of the attachment.

In the drawings 2 represents the standard of the engine having the shaft sleeve 3 adjustably secured thereon in the ordinary manner, as shown.

Mounted upon the shaft 4 and journaled in said sleeve, is the sheave 5 adapted to be driven by means of the flexible cord 6 connected with the treadle pulley (not shown).

Clamped upon the sleeve 3 is the standard 7 having the arm 8 extending in the line of the shaft and overhanging the sheave. To the outer end of this arm is pivoted an annular ring 9, upon the inner face of which is secured a rubber ring or washer 10. This ring is pivoted in such position that it may be turned to bear against the outer side of the pulley, as indicated by the dotted lines.

Pivoted in the standard 7 is the bell crank lever 11, to the power end of which is attached the cord 12 or its equivalent, which hangs within reach of the patient while in the chair. To the fulcrum end of the lever is pivoted the connecting rod 13 leading to the ring 9. There is also arranged in the standard a spring 14 bearing upon the bell crank lever and tending to hold it in the full line position with the brake thrown off the sheave.

Operation: While the engine is being operated to drill or otherwise work upon the tooth of a patient, in case the patient desires to stop or check the same on account of the pain or heat, he can instantly accomplish this result by pulling downward upon the cord. The brake is thus thrown against the side of the sheave and checks the same. If sufficient pressure is applied the sheave is entirely stopped and with it the operation of the burr.

I claim—

1. The combination with the dental engine, of a brake adapted to be applied to the sheave mounted upon the driving shaft, and the bell crank lever connected therewith and adapted to be operated by the patient and control the rotation of the shaft, substantially as described.

2. The combination with the standard of a dental engine, its driving shaft and the pulley mounted thereon, of the brake adapted to be applied to the side of the pulley, the bell crank lever and the rod between said brake and said lever, and means under the control of the patient for operating said lever to apply said brake, substantially as described.

3. In a dental engine, the combination with the driving shaft, its driving pulley and the support for said shaft, of the standard mounted upon said support, the pivoted brake carried thereby and adapted to be brought into contact with the side of said pulley, the bell crank lever pivoted upon said standard, and connected to said brake, and means under the control of the patient for operating said lever, substantially as described.

4. In a dental engine the combination with its standard, the driving shaft, the driving pulley mounted thereon, and the journal support for said shaft, of the standard mounted upon the support, the pivoted annular ring supported upon said standard and adapted to bear against the side of said pulley, the bell crank lever pivoted to said standard, the rod connecting the same to said brake, the spring normally holding said brake off from said pulley, and means operated by the patient for operating the lever to apply said brake, substantially as described.

5. In a dental engine, the combination with the driving shaft and its pulley, of a brake therefor, a spring tending to hold said brake normally away from said pulley, the spring controlled lever connected to said brake, and means under the control of the patient for operating the same to apply said brake, substantially as described.

6. In a dental engine, the combination with its driving shaft and the driving pulley mounted thereon, of the annular ring adjacent to said pulley, the washer or gasket upon said ring adapted to bear against the side of said pulley, a pivoted support for said ring, a spring normally holding said ring away from said pulley, and means under the control of the patient for turning said ring on its pivot for bearing upon the side of the pulley with any desired pressure, substantially as described.

In testimony whereof I have hereunto set my hand this 9th day of August, 1892.

HOWARD T. EACHUS.

In presence of—
   T. D. MERWIN,
   H. S. JOHNSON.